(12) United States Patent
Oshima

(10) Patent No.: US 6,762,888 B1
(45) Date of Patent: Jul. 13, 2004

(54) CONTROL SYSTEM OF ZOOM LENS FOR DIGITAL STILL CAMERAS

(75) Inventor: Shigeru Oshima, Tokyo (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 10/368,238

(22) Filed: Feb. 18, 2003

(51) Int. Cl.[7] ............................................. G02B 15/14
(52) U.S. Cl. ........................ 359/696; 359/823; 359/694; 396/79
(58) Field of Search ................................ 359/823, 694, 359/695, 696, 697; 396/79, 80, 81, 82, 83; 348/357

(56) References Cited

U.S. PATENT DOCUMENTS 6,091,900 A * 7/2000 Kaneda et al. ................ 396/55
6,453,123 B1   9/2002 Oshima
6,501,604 B2 * 12/2002 Onda ......................... 359/696
6,570,717 B1 * 5/2003 Tu et al. ...................... 359/696
6,618,212 B2 * 9/2003 Chikami et al. ............. 359/699

* cited by examiner

*Primary Examiner*—Ricky Mack
(74) *Attorney, Agent, or Firm*—Senniger, Powers, Leavitt & Roedel (57) ABSTRACT

A system to be used in a digital still camera to control zooming of the zoom lens, uses programmed data written in a micro controller unit (MCU) instead of the known cams that are usually used to mechanically control zooming of the zoom lens of digital still cameras, and the system is used to control auto-focusing of the zoom lens with the very mechanism used for zoom controlling by receiving electronic signals (pulses) from the MCU or electronically controlled distance measuring system of the digital still camera.

7 Claims, 7 Drawing Sheets

CONTROL SYSTEM OF ZOOM LENS FOR DIGITAL STILL CAMERAS

BACKGROUND OF THE INVENTION

1. Field of the Invention

The invention relates to a system that controls zooming of the lens for a digital still camera (hereinafter referred to as DSC) receiving electronic signals (pulses) from micro controller unit (hereinafter referred to as MCU), in which the program of zoom lens movement based on the lens design data is written, and also relates to a system that controls auto-focusing of the zoom lens using the very mechanism which drives the zooming of the lens after receiving electronic signals (pulses) from the MCU or electronically controlled distance measuring system of the DSC camera.

2. Background Art

In DSCs, the zoom lens usually fixes the front (headmost) lens element or the first group of lenses at the headmost position of the zoom lens assembly so it will not move. The second group and the third group of lenses move at the same time to enable the whole lens to work as a zoom lens. The movements of the second and third groups of the lenses change the focal length in a straight succession so it works as a zoom lens. From wide angle (shortest focal length of the lens) to telephoto (longest focal length of the lens), the two groups of lenses must move correspondingly with each other. From one focal length position to another focal length position, the moving strokes of the two groups of lenses are determined by the design of the lens. Usually, the moving strokes of these two groups of lenses are controlled mechanically by cams, which are groove cams in most cases.

Figure 1:
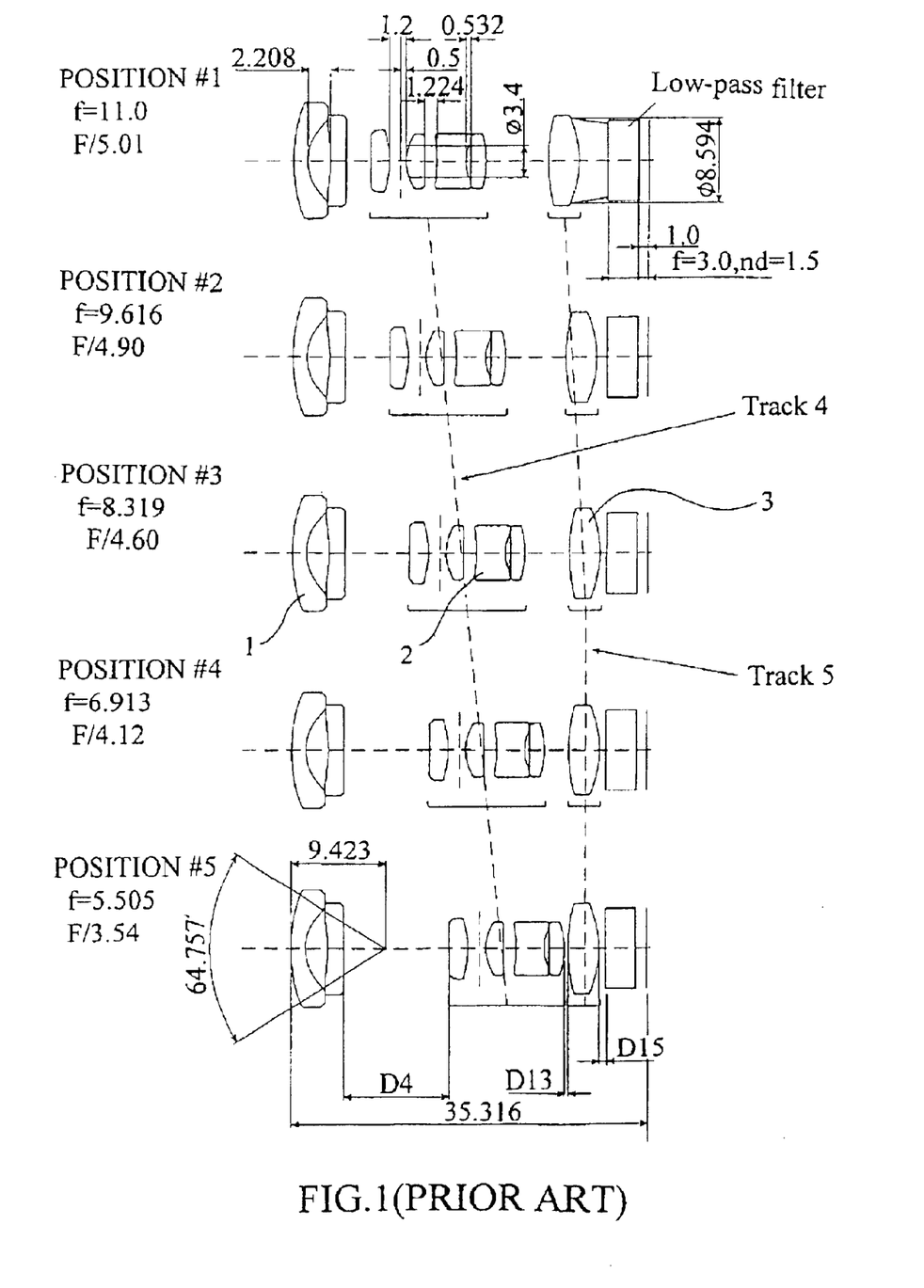
FIG. 1 is a drawing of a typical design of zoom lens for DSCs, which shows the moving tracks of the second and the third groups of lenses.

FIG. 1 shows a typical design of zoom lens with 2× (two times) zooming ratio for DSCs. The first group of lenses (1) is fixed at the front (headmost) position. The second group of lenses (2) and the third group of lenses (3) move back and forth according to the change of the focal length, and tracks (4, 5) show the movements of these two groups. The track (4) (straight line) shows the movement of the second group of lenses (2), and the track (5) (curved line) shows the movement of the third group of lenses (3). Each of the second and third groups of lenses (2, 3) moves at a time correspondingly with each other following the predetermined tracks from one focal length point to another. In FIG. 1, five focal length points are shown as examples of zooming positions. Position #1 shows the positions of the two groups of lenses at the focal length of 11.0 mm (the longest, telephoto position), #2 at the focal length of 9.615 mm, #3 at the focal length of 8.319 mm, #4 at the focal length of 6.913 mm, and #5 at the focal length of 5.505 mm (the shortest, wide angle position).

Figure 2:
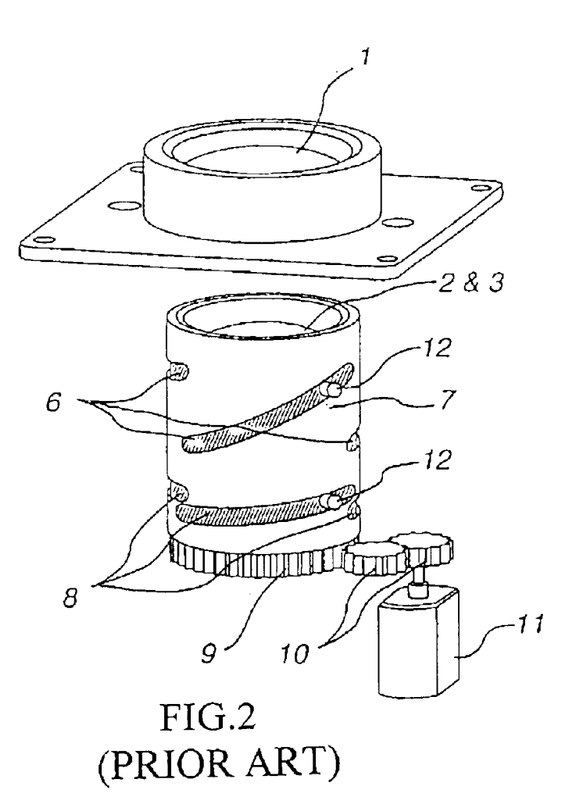
FIG. 2 is a perspective view of the conventional zooming control system by cams.
Figure 2A:
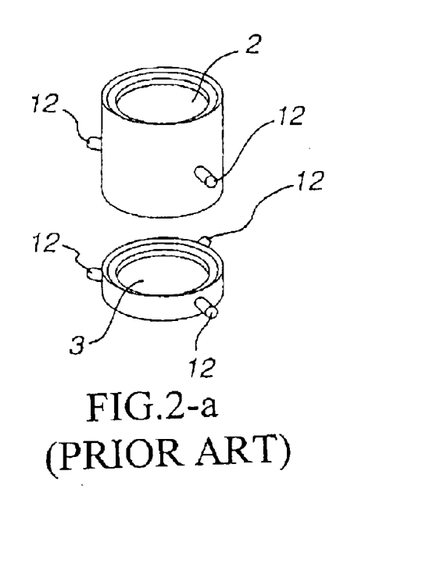

To enable the two groups of lenses to carry out the corresponding movements effectively, a mechanism with groove cams is usually used. FIGS. 2 and 2-a show the conventional mechanical controlling system of zoom lens, which has six groove cams. One group of lenses is controlled by one set of three groove cams of the same curve and dimensions provided on the periphery of the outermost lens barrel (a tube to hold the whole lens assembly), and the other set of three groove cams of the same curve and dimensions provided on the same periphery of the lens barrel controls the other group of lenses.

The first set of groove cams (6) provided on the outermost lens barrel (7) controls the second group of lenses (2), and the second set of groove cams (8) provided on the outermost lens barrel (7) controls the third group of lenses (3). At the bottom rim of the outermost lens barrel (7), the gear teeth (9) are provided and engaged with the driving gears (10) of the stepping motor (11). When the zooming switch is turned on, the stepping motor (11) starts rotating, and then the outermost lens barrel (7) starts rotating. While the outermost lens barrel (7) rotates, the groove cams (6, 8) move too, and the two groups of lenses (2, 3) also move back and forth (up and down) through the movements of the pins (12) fixed on the lens barrel of each group of lenses and inserted into the slots of the groove cams, which move according to the curves of the groove cams (6, 8). The curves of the groove cams (6, 8) are designed accurately according to the design data of the zoom lens, namely, according to the tracks like the tracks (4, 5) shown in FIG. 1. The direction of lens movement (back or forth) is determined by the direction of the rotation of the stepping motor.

In this kind of mechanical controlling of zooming, the accuracy of the groove cams is highly required and it is very difficult to manufacture lens barrels with such accurate groove cams, and consequently, the cost of such accurate parts and components is quite expensive. The assembling and adjustment of the lens with such controlling mechanism are also quite difficult.

Furthermore, to focus the lens automatically, so-called auto-focusing, it is usually necessary to adjust the position of one of the groups of lenses regardless of the lens zooming mechanism. Receiving signals from auto-focusing systems of the MCU or electronic distance measuring system of the DSC, one of the groups of lenses must move back and forth very slightly. However, in the case of theretofore-explained mechanical cam type zooming system, it is physically impossible because all the moving groups of lenses are connected to the zooming cam mechanism. If one of the groups of lenses starts moving, the other group of lenses starts moving too, and it is impossible for one of the groups alone to move separately from the zooming system. Therefore, in the case of mechanical cam zooming system of DSCs, the image sensor like CCD or C-MOS usually moves to adjust the lens focus instead of driving any groups of lenses or lens element.

However, it is also extremely difficult to move the whole image sensor, which is connected to the print-circuit board (PCB), and this means that the image sensor must move together with a part of the PCB or with connecting wires.

Figure 3:
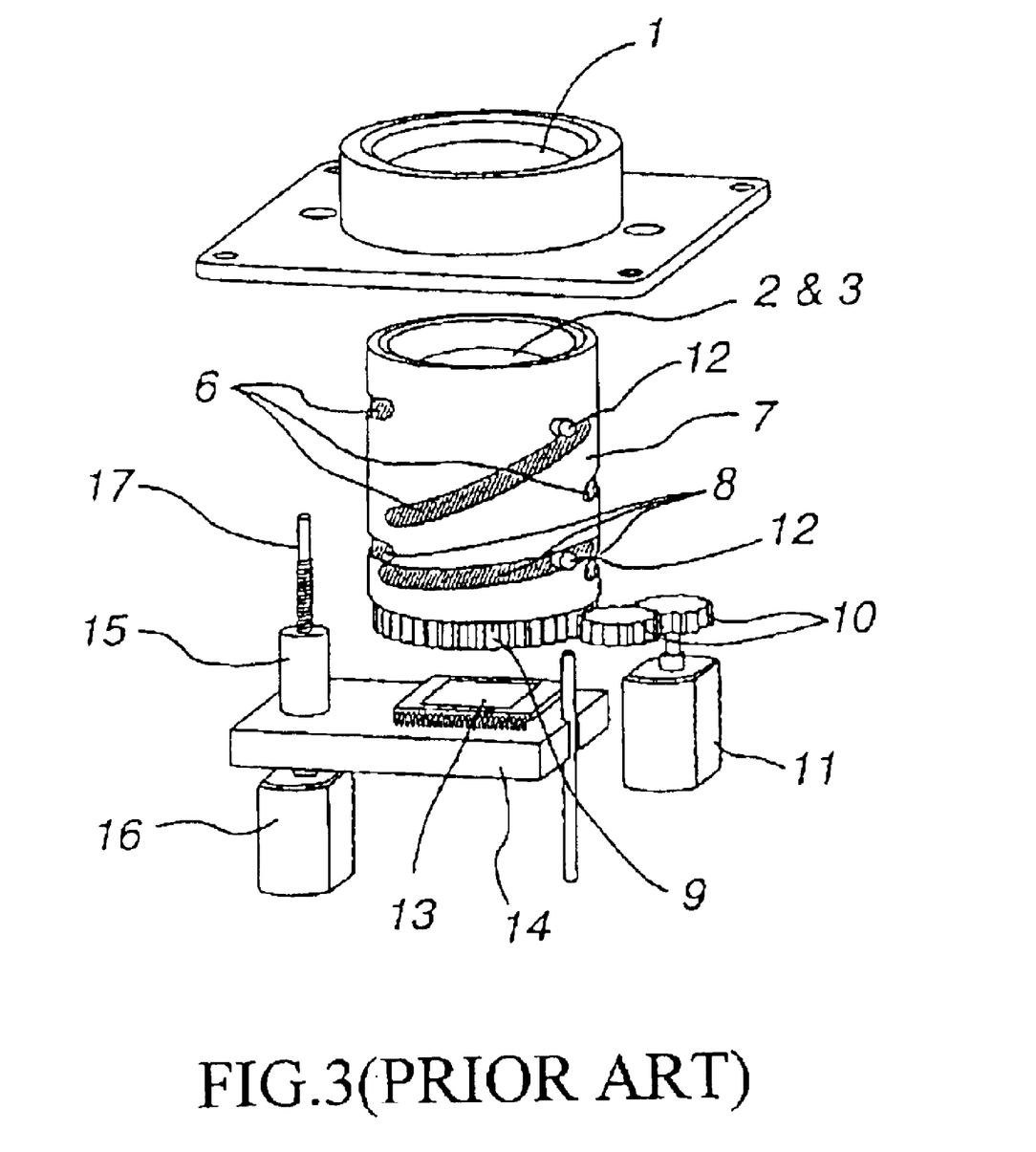
FIG. 3 is a perspective view of the conventional zooming control system with cams and the auto-focusing mechanism to move the image sensor for focus adjustment.

The lens focusing of the DSCs must be adjusted with a very small scale unit of a hundredth of a millimeter, and if the focusing is adjusted by moving the image sensor, the horizontality of the image sensor against the lens must also be extremely high and the image sensor must be kept perfectly even with the lens. This kind of lens focusing method is also very difficult to carry out in comparison with the method of moving the lens element or one of the groups of lenses, which are held in lens barrels (tubes) and can move smoothly and easily back and forth (up and down). FIG. 3 shows the mechanism of focusing by moving the image sensor. The image sensor (13) is placed just behind the rearmost lens, and the image sensor (13) is fixed on the base (14). The threaded bearing (15) is formed as a part of the image sensor base (14). The stepping motor (16) is provided to drive the auto-focusing mechanism, and the stepping motor (16) has a screw rod (17) as an extension of the motor shaft. The screw rod (17) engages with the female-screw-thread provided at the inner wall of the threaded bearing (15).

When the auto-focusing system switch is turned on, the stepping motor (16) rotates the screw rod (17) such that the threaded bearing (15) moves back and forth (up and down). Thus, the image sensor (13) moves back and forth (up and down) regardless of the movement of lens zooming.

The accuracy required for such movement of image sensor and adjustment of lens focus by such a delicate method is very high, and even if it is possible, it will be quite expensive.

To eliminate the above explained difficulties of controlling lens zooming mechanically by cams and of adjusting lens focus by moving the image sensor, it is preferable to have a much simpler system with less and inexpensive parts and components, and with much easier way of assembling.

Figure 4:
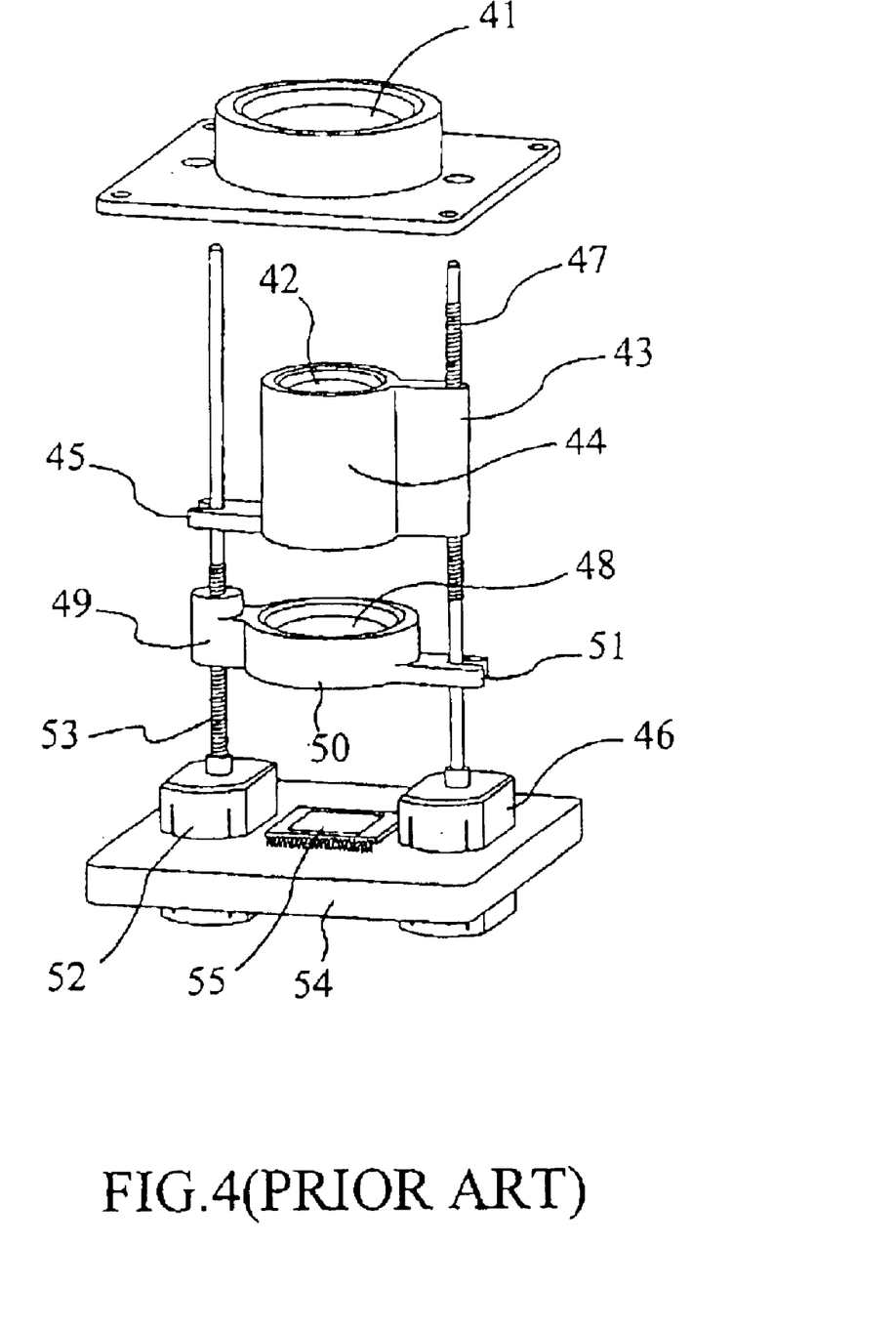
FIG. 4 is a perspective view of the control system of zoom lens for DSCs disclosed in U.S. Pat. No. 6,453,123.
Figure 5:
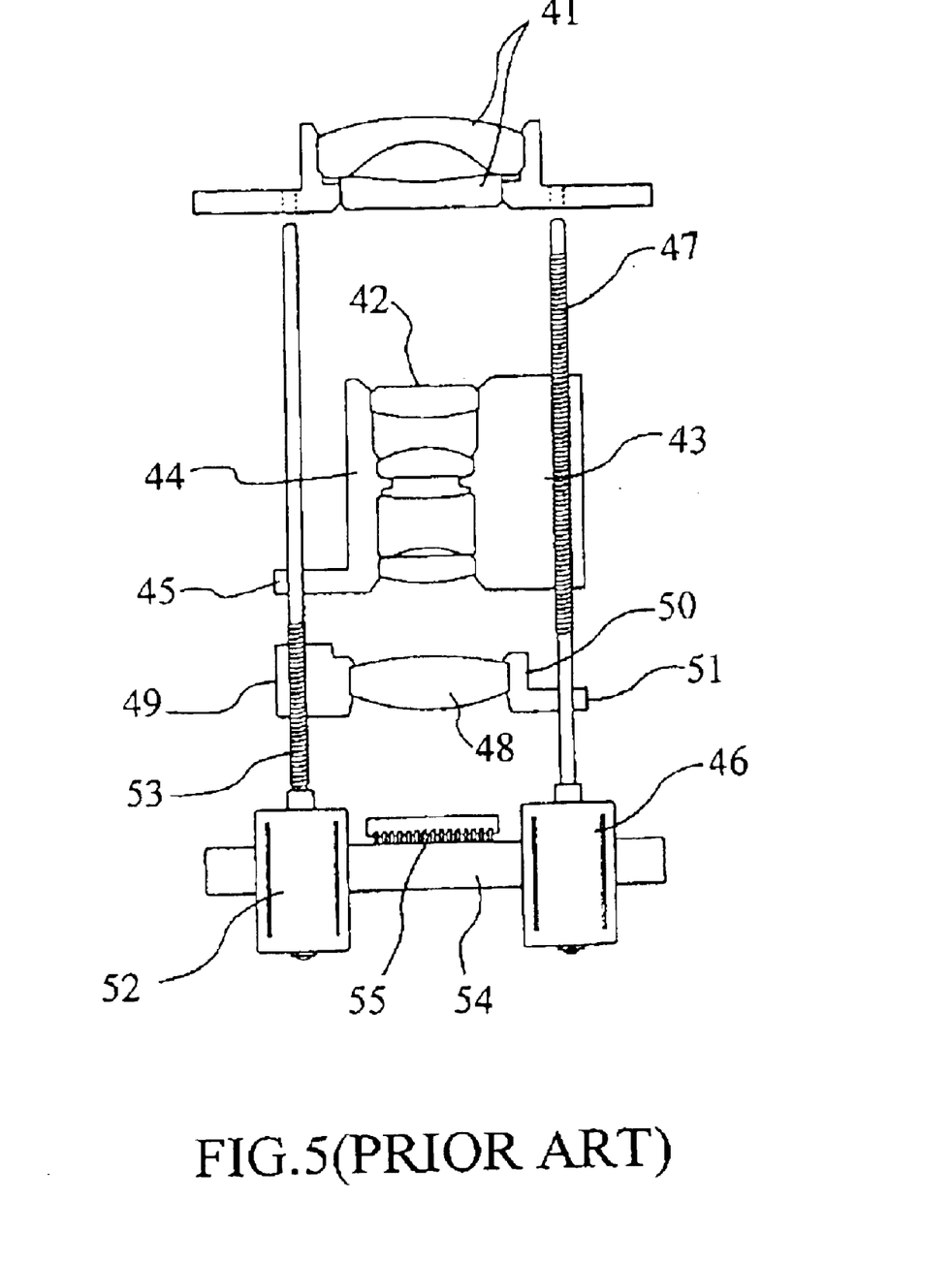
FIG. 5 is a partly cross-sectional view of the control system of zoom lens for DSCs shown in FIG. 4.

An improved control system of zoom lens for DSCs has been disclosed in U.S. Pat. No. 6,453,123 issued to Arc Design, Inc., the same assignee of the subject application. In FIGS. 4 and 5, the control system of zoom lens for DSCs comprises a first (front) group of lenses (41) fixed at the headmost position of the zoom lens assembly, a second group of lenses (42) which is placed next to the first group of lenses (41), a first threaded bearing (43) formed as a part of a second lens barrel (44) of the second group of lenses (42), a first position stabilizing fork (45) which is formed on one side of the second lens barrel (44) of the second group of lenses (42) opposite to the first threaded bearing (43), a first stepping motor (46) with a first screw rod (47) provided as an extension of the motor shaft, which is screwed into the bearing hole of the first threaded bearing (43) of the second group of lenses (42) and engages with the thread provided on the inner wall of the bearing hole of the first threaded bearing (43), a third group of lenses (48) which is placed next to the second group of lenses (2), a second threaded bearing (49) formed as a part of a third lens barrel (50) of the third group of lenses (48), a second position stabilizing fork (51) which is formed on one side of the third lens barrel (50) of the third group of lenses (48) opposite to the second threaded bearing (49), and a second stepping motor (52) with a second screw rod (53) provided as an extension of the motor shaft, which is screwed into the bearing hole of the second threaded bearing (49) of the third group of lenses (48) and engages with the thread provided on the inner wall of the bearing hole of the second threaded bearing (49). All these component parts are assembled on an assembly base (54) on which an image sensor (55) like CCD or C-MOS is placed just underneath of the rearmost element of the lens assembly.

The second group of lenses (42) is assembled in the second lens barrel (44), and the second lens barrel (44) is supported by the first screw rod (47) extending from the shaft of the first stepping motor (46) which is screwed into the hole of the first threaded bearing (43) formed as a part of the second lens barrel (44) and engages with the inner thread of the first threaded bearing (43).

The second lens barrel (44) is also supported by the first position stabilizing fork (45), which is placed over the second screw rod (53) extending from the shaft of the second stepping motor (52), thus keeping the second screw rod (53) in the slot of the first position stabilizing fork (45) so that the second lens barrel (44) cannot rotate. The second lens barrel (44) can be moved back and forth (up and down) along the first screw rod (47) and the second screw rod (53) by rotating the first screw rod (47).

The third group of lenses (48) is assembled in the third lens barrel (50), and the third lens barrel (50) is supported by the second screw rod (53) extending from the shaft of the second stepping motor (52) which is screwed into the hole of second threaded bearing (49) formed as a part of the third lens barrel (50) and engages with the inner thread of the second threaded bearing (49). The third lens barrel (10) is also supported by the second position stabilizing fork (51), which is placed over the first screw rod (47) extending from the shaft of the first stepping motor (46), thus keeping the first screw rod (47) in the slot of the second position stabilizing fork (51) so that the third lens barrel (50) cannot rotate. The third lens barrel (50) can be moved back and forth (up and down) along the second screw rod (53) and the first screw rod (47) by rotating the second screw rod (53).

The instant that the power zooming switch of either telephoto or wide angle is turned on, the stepping motors (46, 52) start moving simultaneously and the two groups of lenses (42, 48) start moving to control zooming of the total lens in the telephoto direction or wide-angle direction receiving the zooming position signals of the zoom lens, which are programmed beforehand and written in the MCU of the DSC as the lens moving data to control each group of lenses for each focal length position, namely, the data of the moving tracks of the lens group like the tracks (4, 5) shown in FIG. 1.

While either of the telephoto switch or wide-angle switch is on, the MCU keeps sending signals to each stepping motor (46, 52) to move the lens groups from a point to another, and when the switch is turned off, the movements of the two lens groups stop there instantly. The positions where the two lens groups (42, 48) stop is to be remembered by the MCU, and when either of the telephoto switch or wide-angle switch is turned on next time, the lens zooming starts from the focal length position where the lens groups stopped last time.

As shown in FIGS. 4 and 5, the whole assembly is built on the assembly base (54), and the image sensor (55) is placed and fixed just behind (underneath) the rearmost element of the zoom lens. It is not necessary to move the image sensor (55) at all for focusing. By rotating one of the two stepping motors (46, 52) alone, one of the two lens groups (42, 48) can be moved back and forth delicately, and by moving one of the two lens groups (42, 88) alone, the whole zoom lens can be focused properly on the image sensor (55). Thus, when the auto-focusing signals are sent from the MCU of the digital camera to focus the lens properly using the through-the-lens auto-focusing system, one of the lens barrels (44, 50) starts moving alone and stops when the image obtained on the image sensor (55) comes sharply in focus. Without using any control mechanism depending on the image sensor movement, one of the stepping motors (46, 52) used for zooming control can move one of the lens groups (42, 48) to focus the whole zoom lens automatically after receiving auto-focusing signals from the MCU, independently from the zooming control mechanism.

The inventor of the subject application further develops a new structure of a control system of zoom lens for DSCs, that can be used for another type of zoom lens design, and will be described in detail hereinafter.

SUMMARY OF THE INVENTION

In this invention, the groove cams, which are used in conventional mechanism of zooming control, are eliminated. Instead of the cams, the two lens groups are controlled by two stepping motors, and one stepping motor drives the first group of lenses and the other stepping motor drives the second group of lenses. The threaded bearing is formed as a part of the lens barrel of each moving lens group on the side of the barrel. The stepping motor has a screw rod as an extension of the motor shaft, and the screw rod engages with the female-screw-thread provided in the inner wall of the threaded bearing. The screw rod supports the lens barrel together with some sort of position-stabilizing means to stop rotation of the lens barrel itself.

When the stepping motors start rotating simultaneously, both of the screw rods start rotating and by the rotation of the rods, the threaded bearings on the male-thread of screw rods are driven, and the two lens groups start moving back and forth (up and down) depending on the direction of the motor rotation as the threaded bearings move back and forth (up and down).

In the case of this invention, instead of having groove cams to mechanically control zooming of the lens, the lens moving data that controls each group of lenses for each focal length position, namely, the data of the moving tracks of the lens group like the tracks (4, 5) shown in FIG. 1 must be programmed as electronic position signal data and written in the MCU of the DSC. The instant that the power zooming switch of either telephoto or wide angle is turned on, the stepping motors start moving simultaneously and the lens groups start moving to control zooming of the total lens in telephoto direction or wide-angle direction after receiving signals from the MCU according to the designed lens moving tracks.

While either of the telephoto or wide-angle switches is on, the MCU keeps sending signals to each stepping motor to move the lens groups from a point to another, and when the switch is turned off, the lens movement stops instantly there. The position where the lens stops is to be remembered by the MCU, and when either of the telephoto switch or wide-angle switch is turned on again, the lens zooming starts from the focal length position where the lens stopped last time.

At the same time, there is no cam at all, which disables the lens focusing separately from the lens zooming mechanism. Instead, a part of the zooming mechanism, namely one of the stepping motors, can be used to drive one of the moving groups of lenses. By moving the first group of lenses, lens focusing can be adjusted. After or before controlling zooming, the MCU will send a signal where the first group of lenses should be placed to adjust the focus, and the first stepping motor starts moving and moves the first group of lenses to a proper position.

By using two stepping motors, mechanical groove cams which require extreme accuracy in manufacturing are eliminated. Thus, zooming can be controlled quite easily by electronic signals only, which are pre-programmed and written in the camera MCU. Furthermore, the auto-focusing can be adjusted by using the first stepping motor to move the first group of lenses, thereby eliminating the difficult method of lens focusing through moving image sensor.

BRIEF DESCRIPTION OF DRAWINGS

FIG. 2-a is a perspective view of two groups of lenses assembled in each lens barrel, which are placed in the conventional zooming control system with cams shown in FIG. 2;

DETAILED DESCRIPTION OF THE INVENTION

Figure 6:
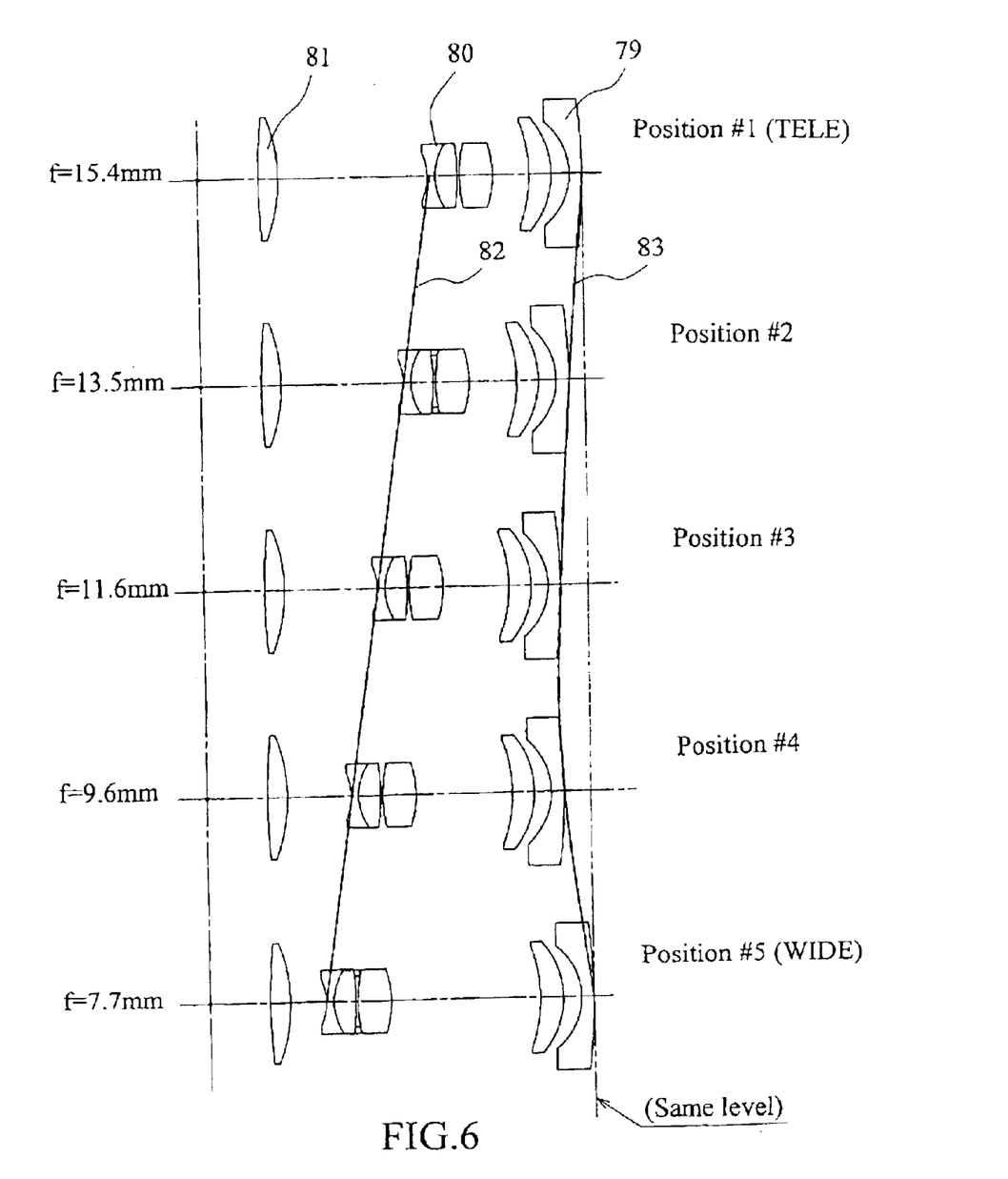
FIG. 6 is a drawing of another design of zoom lens for DSCs to be used for the present invention, which shows the moving tracks of the first and second groups of lenses.

FIG. 6 shows another design of zoom lens with 2× (two times) zooming ratio for DSCs. The first group of lenses (79) is placed at the front (headmost) position and the second group of lenses (80) is placed next to the first group of lenses (79), and they move back and forth according to the change of the focal length, and tracks (82, 83) show the movements of these two groups. The track (82) (straight line) shows the movement of the second group of lenses (80), and the track (83) (curved line) shows the movement of the first group of lenses (79). The third group of lenses (81) is placed at the rear most position and fixed not to move. Each of the first and second groups of lenses (79, 80) moves at time correspondingly with each other following the predetermined tracks from one focal length point to another. In FIG. 6, five focal length points are shown as examples of zooming positions. Position #1 shows the positions of the two groups of lenses at the focal length of 15.4 mm (the longest, telephoto position), #2 at the focal length of 13.5 mm, #3 at the focal length of 11.6 mm, #4 at the focal length of 9.6 mm, and #5 at the focal length of 7.7 mm (the shortest, wide angle position).

Figure 7:
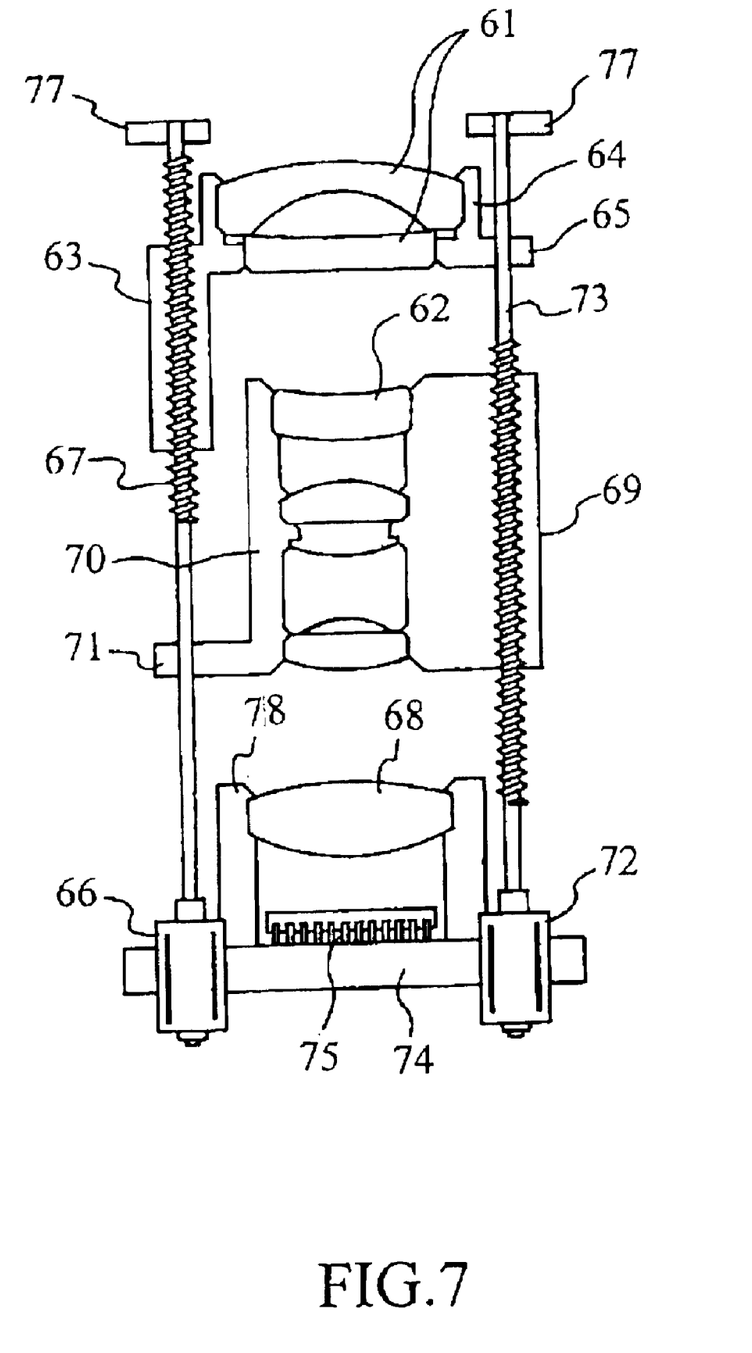
FIG. 7 is a partly cross-sectional view of a new structure of a control system of zoom lens for DSCs according to the present invention.

FIG. 7 shows a new structure of a control system of zoom lens for DSCs according to the present invention, comprising a first (front) group of lenses (61) (or first element) positioned at the headmost position of the zoom lens assembly; a first threaded bearing (63) formed as a part of a first lens barrel (64) of the first group of lenses (61); a first means for position stabilizing, such as a first position stabilizing fork (65) which is formed on one side of the first lens barrel (64) of the first group of lenses (61) opposite to the first threaded bearing (63); a first stepping motor (66) with a first screw rod (67) provided as an extension of the motor shaft, which is screwed into the bearing hole of the first threaded bearing (63) of the first group of lenses (61) and engages with the thread provided on the inner wall of the bearing hole of the first threaded bearing (63); a second group of lenses (62) which is placed next to the first group of lenses (61); a second threaded bearing (69) formed as a part of a second lens barrel (70) of the second group of lenses (62); a second means for position stabilizing, such as a second position stabilizing fork (71) which is formed on one side of the second lens barrel (70) of the second group of lenses (62) opposite to the second threaded bearing (69); a second stepping motor (12) with a second screw rod (73) provided as an extension of the motor shaft, which is screwed into the bearing hole of the second threaded bearing (69) of the second group of lenses (62) and engages with the thread provided on the inner wall of the bearing hole of the second threaded bearing (69); and a third group of lenses (68) which is fixed next to the second group of lenses (62) and assembled in a third lens barrel (78). All these component parts are assembled on an assembly base (74) on which an image sensor (75) like CCD or C-MOS is placed just underneath the rearmost element of the lens assembly.

The first group of lenses (61) is assembled in the first lens barrel (64), and the first lens barrel (64) is supported by the first screw rod (67) extending from the shaft of the first stepping motor (66) which is screwed into the hole of first threaded bearing (63) formed as a part of the first lens barrel (64) and engages with the inner thread of the first threaded bearing (63). The first lens barrel (64) is also supported by the first position stabilizing fork (65), which is placed over the second screw rod (73) extending from the shaft of the second stepping motor (72), thus keeping the second screw rod (73) in the slot of the first position stabilizing fork (65) so that the first lens barrel (64) cannot rotate. The first lens barrel (64) can be moved back and forth (up and down) along the first screw rod (67) and the second screw rod (73) by rotating the first screw rod (67).

The second group of lenses (62) is assembled in the second lens barrel (70), and the second lens barrel (70) is supported by the second screw rod (73) extending from the shaft of the second stepping motor (72) which is screwed into the hole of second threaded bearing (69) formed as a part of the second lens barrel (70) and engages with the inner thread of the second threaded bearing (69). The second lens barrel (70) is also supported by the second position stabilizing fork (71), which is placed over the first screw rod (67) extending from the shaft of the first stepping motor (66), thus keeping the first screw rod (67) in the slot of the second position stabilizing fork (71) so that the second lens barrel (70) cannot rotate. The second lens barrel (70) can be moved back and forth (up and down) along the second screw rod (73) and the first screw rod (67) by rotating the second screw rod (73).

Both the first and second screw rods (67, 73) are also held by the bearings (77) as shown in FIG. 7.

The instant that the power zooming switch of either telephoto or wide angle is turned on, the first and second stepping motors (66, 72) start moving simultaneously and the first and second groups of lenses (61, 62) start moving to control zooming of the total lens in telephoto direction or wide-angle direction after receiving the zooming position signals of the zoom lens, which are to be programmed beforehand and written in the MCU of the DSC as the lens moving data to control each group of lenses for each focal length position, namely, the data of the moving tracks of the lens group like the tracks (82, 83) shown in FIG. 6.

While either of the telephoto switch or wide-angle switch is on, the MCU keeps sending signals to each of the first and second stepping motors (66, 72) to move the first and second groups of lenses (61, 62) from a point to another, and when the switch is turned off, the movements of the two groups of lenses (61, 62) stop there instantly. The positions where the two groups of lenses (61, 62) stopped is to be remembered by the MCU, and when either of the telephoto switch or wide-angle switch is turned on again, the lens zooming starts from the focal length position where the two groups of lenses (61, 62) stopped last time.

As shown in FIG. 7, the whole assembly is built on the assembly base (74), and the image sensor (75) is placed and fixed just behind (underneath) the rearmost element of the zoom lens. In this invention, it is not necessary to move the image sensor (75) for focusing at all. By rotating the first stepping motor (66) alone, the first group of lenses (61) can be moved back and forth delicately, and by moving the first group of lenses (61) alone, the lens can be focused properly against the image sensor (75). Therefore, when the auto-focusing signals are sent from the MCU of the digital still camera to focus the lens properly using the through-the-lens auto-focusing system, the first lens barrel (64) starts moving alone and stops when the image obtained on the image sensor (75) comes sharply in focus. Thus in this invention, without using any control mechanism depending on the image sensor movement, the first stepping motor (66) used for zooming control can move the first group of lenses (61) to focus the zoom lens automatically after receiving auto-focusing signals from the MCU, but independently from the zooming control mechanism.

As theretofore explained, the known groove cams for zooming control that require very high accuracy in manufacturing are not used in this invention. Also, the very difficult mechanism of image sensor moving of lens focusing is not used. Instead, only two stepping motors (66, 72) control the zooming in this invention. Furthermore, one of the two stepping motors, namely the first stepping motor (66), can be used for auto-focusing. Thus, the whole system and mechanism of this invention are much simpler, inexpensive and easy to assemble.

List of Reference Numerals

FIG. 1
1. First group of lenses
2. Second group of lenses
3. Third group of lenses
4. Track
5. Track FIG. 2
1. First group of lenses
2. Second group of lenses
3. Third group of lenses
6. First set of groove cams
7. Outermost lens barrel
8. Second set of groove cams
9. Gear teeth
10. Driving gears of the stepping motor
11. Stepping motor FIG. 2-a
1. Second group of lenses
2. Third group of lenses
12. Pins FIG. 3
1. First group of lenses
2. Second group of lenses
3. Third group of lenses
6. First set of groove cams
7. Outermost lens barrel
8. Second set of groove cams
9. Gear teeth
10. Driving gears of the stepping motor
11. Stepping motor
12. Pins
13. Image sensor
14. Base
15. Threaded bearing
16. Stepping motor
17. Screw rod FIG. 4
41. First group of lenses
42. Second group of lenses
43. First threaded bearing
44. Second lens barrel
45. First position stabilizing fork
46. First stepping motor
47. First screw rod
48. Third group of lenses
49. Second threaded bearing
50. Third lens barrel
51. Second position stabilizing fork 52. Second stepping motor
53. Second screw rod
54. Assembly base
55. Image sensor
   FIG. 5
41. First group of lenses
42. Second group of lenses
43. First threaded bearing
44. Second lens barrel
45. First position stabilizing fork
46. First stepping motor
47. First screw rod
48. Third group of lenses
49. Second threaded bearing
50. Third lens barrel
51. Second position stabilizing fork
52. Second stepping motor
53. Second screw rod
54. Assembly base
55. Image sensor
   FIG. 6
79. First group of lenses
80. Second group of lenses
81. Third group of lenses
82. Track
83. Track
   FIG. 7
61. First group of lenses
62. Second group of lenses
63. First threaded bearing
64. First lens barrel
65. First position stabilizing fork
66. First stepping motor
67. First screw rod
68. Third group of lenses
69. Second threaded bearing
70. Second lens barrel
71. Second position stabilizing fork
72. Second stepping motor
73. Second screw rod
74. Assembly base
75. Image sensor
77. Bearing
78. Third lens barrel

What is claimed is:

1. A control system of zoom lens for a digital still camera which controls zooming of the zoom lens using programmed data written in the micro controller unit (MCU) of the digital still camera, and at the same time controls auto-focusing of the zoom lens with the very mechanism which is used for zoom controlling by receiving electronic signals (pulses) from the MCU or electronically controlled distance measuring system of the digital still camera, comprising:

(a) an assembly base on which said control system of zoom lens for the digital still camera is assembled;
   (b) a first group of lenses, which is assembled in a first lens barrel and placed at the headmost position of said assembly base;
   (c) a first threaded bearing which is formed as a part of said first lens barrel of said first group of lenses;
   (d) a first means for position stabilizing said first lens barrel not to rotate;
   (e) a first stepping motor to drive said first lens barrel;
   (f) a first screw rod which is provided on and connected to a shaft of said first stepping motor as an extension of the motor shaft and is screwed into a bearing hole of said first threaded bearing of said first lens barrel of said first group of lenses and engages with a thread provided on an inner wall of said first threaded bearing of said first lens barrel of said first group of lenses;
   (g) a second group of lenses, which is assembled in a second lens barrel and placed next to said first group of lenses;
   (h) a second threaded bearing which is formed as a part of said second lens barrel of said second group of lenses;
   (i) a second means for position stabilizing said second lens barrel not to rotate;
   (j) a second stepping motor to drive said second lens barrel;
   (k) a second screw rod which is provided on and connected to a shaft of said second stepping motor as an extension of the motor shaft and is screwed into a bearing hole of said second threaded bearing of said second lens barrel of said second group of lenses and engages with a thread provided on an inner wall of said second threaded bearing of said second lens barrel of said second group of lenses; and
   (l) a third group of lenses, which is assembled in a third lens barrel and placed next to said second group of lenses.

2. A control system of zoom lens for a digital still camera as claimed in claim 1, wherein while said first lens barrel is moving back and forth, said first lens barrel is supported and stabilized by said first screw rod engaged with said first threaded bearing and said first means for position stabilizing said first lens barrel not to rotate to smoothly move said first lens barrel without any harmful rotation.

3. A control system of zoom lens for a digital still camera as claimed in claim 1, wherein while said second lens barrel is moving back and forth, said second lens barrel is supported and stabilized by said second screw rod engaged with said second threaded bearing and said second means for position stabilizing said second lens barrel not to rotate to smoothly move said second lens barrel without any harmful rotation.

4. A control system of zoom lens for a digital still camera as claimed in claim 1, wherein said first lens barrel in which said first group of lenses are assembled is connected to said first screw rod of said first stepping motor through said first threaded bearing so that said first barrel moves back and forth (up and down) when said first stepping motor is rotating after receiving the data-signals of zooming of the zoom lens which is pre-programmed and written in the micro controller unit (MCU) of the digital still camera.

5. A control system of zoom lens for a digital still camera as claimed in claim 1, wherein said second lens barrel in which said second group of lenses are assembled is connected to said second screw rod of said second stepping motor through said second thread bearing so that said second barrel moves back and forth (up and down) when said second stepping motor is rotating after receiving the data-signals of zooming of the zoom lens which is pre-programmed and written in the micro controller unit (MCU) of the digital still camera.

6. A control system of zoom lens for a digital still camera as claimed in claim 1, wherein when one of said first and second stepping motors starts rotating, the other stepping motor starts rotating exactly at the same time or strictly simultaneously so that said first and second groups of lenses start moving simultaneously according to the zoom lens movement data received from the MCU of the digital still camera to get all the said groups of lenses as a whole to work as a complete zooming lens.

7. A control system of zoom lens for a digital still camera as claimed in claim 1, wherein when said first stepping motor receives signals of auto-focusing from the MCU of the digital still camera, said first stepping motor alone starts moving and the rotation of said first stepping motor moves said first lens barrel back and forth until the whole zoom lens is properly in focus, and stops when said first stepping motor receives a signal to stop from the MCU.

* * * * *